United States Patent [19]
Lee et al.

[11] Patent Number: 6,112,073
[45] Date of Patent: Aug. 29, 2000

[54] APPARATUS FOR PACKAGING ELECTRONICS

[75] Inventors: In Low Lee; Alan James Dutson, both of Fort Worth, Tex.

[73] Assignee: Motorola, Inc., Schaumburg, Ill.

[21] Appl. No.: 09/012,275

[22] Filed: Jan. 23, 1998

[51] Int. Cl.[7] .................................................. H04B 1/38
[52] U.S. Cl. ........................... 455/347; 455/351; 361/816
[58] Field of Search ............................... 455/90, 575, 347, 455/348, 351; 361/814, 816; 320/2, 13

[56] References Cited

U.S. PATENT DOCUMENTS

| | | |
|---|---|---|
| 5,175,873 | 12/1992 | Goldenberg et al. .................... 455/347 |
| 5,659,455 | 8/1997 | Herbert . |
| 6,016,423 | 1/2000 | Ross et al. ............................... 455/90 |

*Primary Examiner*—Thanh Cong Le
*Attorney, Agent, or Firm*—R. Louis Breeden

[57] ABSTRACT

An apparatus for packaging electronics (100) having improved mechanical integrity includes an energy storage apparatus (110), an electronic assembly (120) and a spacing apparatus (130). A subscriber unit (500) includes: an energy storage element (110, 550), coupled to a spacing element (130), in one form a capacitor, and in another form a battery, and an electronic assembly (120) including a radio frequency system (124) controlled by a programmable processing system (122).

8 Claims, 3 Drawing Sheets

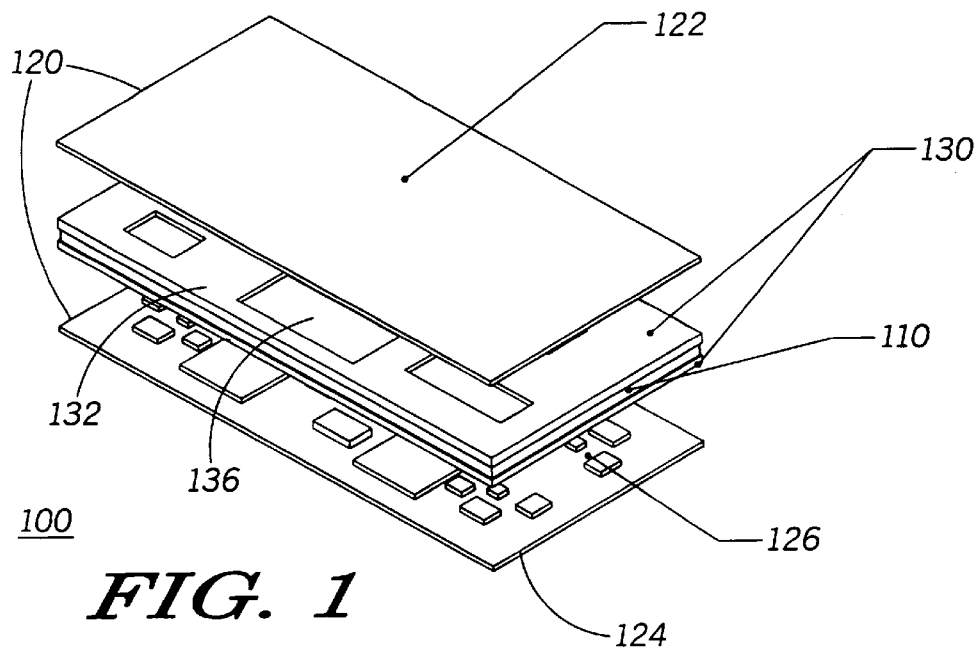
FIG. 1
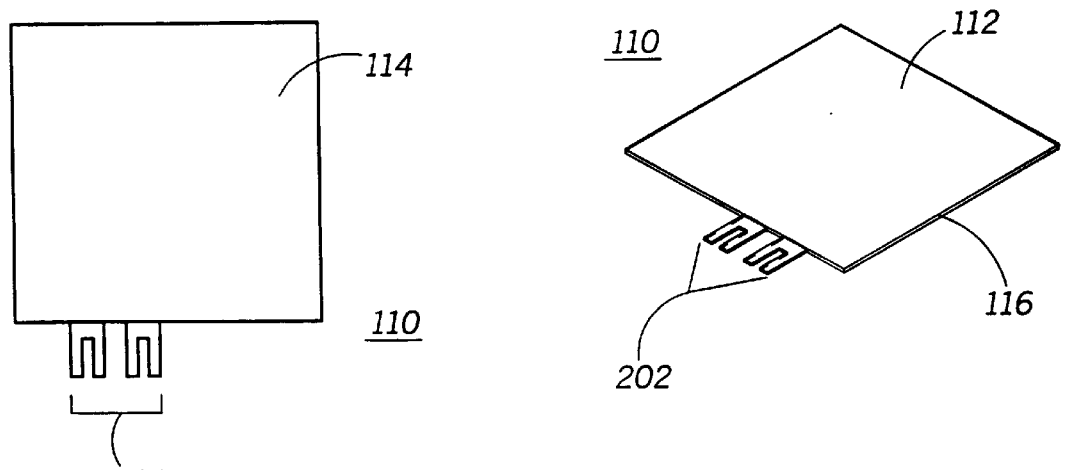
FIG. 2
FIG. 3

APPARATUS FOR PACKAGING ELECTRONICS

FIELD OF THE INVENTION

The present invention relates generally to apparatus for packaging electronics, and specifically to an apparatus for packaging electronics, the apparatus having improved mechanical integrity.

BACKGROUND OF THE INVENTION

In the field of packaging electronic elements, many breakthroughs have been made to provide smaller, lighter, and more powerful products. The advent of sub-micron solid state technologies has allowed designers and manufactures to place a growing density of electronics in a smaller space, yet there are limitations.

One design constraint in the area of electronics packaging relates to providing more efficient, yet smaller energy sources. Another design constraint relates to shielding various sub-systems from electromagnetic interference from other sub-systems when all of the sub-systems must share a common closely compacted electronic package.

Presently there are viable design tradeoffs available, but the multi-purpose use of existing components could enhance the continued trend toward smaller, lighter, and more powerful electronic elements. What is needed are multi-functional components that support this trend while maintaining mechanical integrity in the packaging.

BRIEF DESCRIPTION OF THE DRAWINGS

The features of the present invention that are believed to be novel are set forth with particularity in the appended claims. However, the invention together with further advantages thereof, may best be understood by reference to the accompanying drawings, wherein:

FIG. 1 is a diagram for an electronics packaging apparatus in accordance with the instant invention;

FIG. 2 is a diagram of an energy storage apparatus in accordance with the instant invention;

FIG. 3 is a diagram displaying an oblique view of the energy storage apparatus in accordance with the instant invention;

DETAILED DESCRIPTION OF A PREFERRED EMBODIMENT

Figure 4:
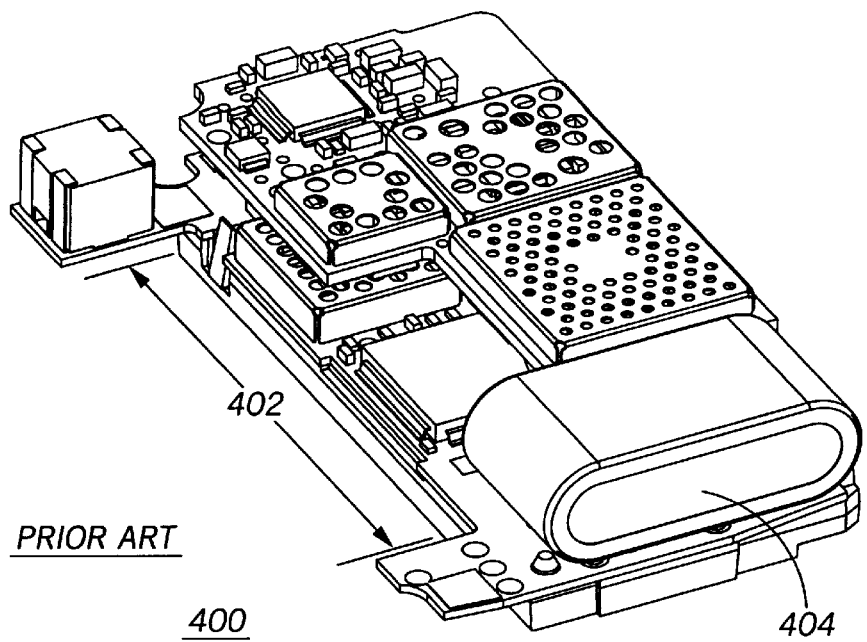
FIG. 4 is a prior art representation of an exemplary subscriber unit from a perspective view.

The present invention relates to an apparatus for packaging electronic devices. These electronic devices preferably are arranged to provide efficient use of limited energy resources as well as reliable grounding and shielding capabilities.

A preferred apparatus embodiment is an apparatus for packaging electronics, the apparatus having improved mechanical integrity, the apparatus comprising: an energy storage apparatus for providing power; an electronic assembly, having an irregular surface lying in close proximity to said energy storage apparatus; and a spacing apparatus, mechanically coupled to said energy storage apparatus, having a first surface coincident with the irregular surface. The spacing apparatus preferably comprises a resilient material with insulating properties. The energy storage apparatus preferably comprises a first conductive surface and a second conductive surface separated by a dielectric material. The energy storage alternatively provides a conductive surface of zero potential reference for the electronic assembly. Also, the energy storage apparatus provides electrostatic protection for the electronic assembly. In one form, the energy storage apparatus is a capacitor. In another form, the energy storage apparatus is a battery.

An alternative apparatus embodiment is a subscriber unit (SU) having improved mechanical integrity, the subscriber unit comprising: an energy storage element for providing power; an electronic assembly, having an irregular surface lying in close proximity to said energy storage element, comprising a radio frequency system; a spacing element, mechanically coupled to said energy storage element, having a first surface coincident with the irregular surface; and a processing system coupled to the electronic assembly and programmed to control the energy storage element and the electronic assembly. The spacing element of the subscriber unit preferably comprises a resilient material with insulating properties. The energy storage element of the subscriber unit preferably comprises a first conductive surface and a second conductive surface separated by a dielectric material. The energy storage element of the subscriber unit alternatively provides a conductive surface of zero potential reference for the electronic assembly. Also, the energy storage element of the SU provides electrostatic protection for the electronic assembly. In one form, the energy storage element of the SU is a capacitor. In another form, the energy storage element of the SU is a battery. The radio frequency system of the SU preferably comprises a receiver. Alternatively, the radio frequency system of the SU comprises a transmitter.

The FIG. 1 diagram of an electronic device in accordance with the instant invention depicts, by way of example, an apparatus 100 for packaging electronics such as can be used with a conventional communications system. The apparatus 100 for packaging electronics comprises an energy storage apparatus 110 for providing power to the electronics device in conjunction with a primary cell energy source or a rechargeable energy source not depicted in the FIG. 1 example. The energy storage apparatus lies in close proximity with a conventional electronic assembly 120 having an irregular surface. The electronic assembly 120 comprises known discrete and solid-state electronic components and sub-systems. The electronic assembly 120 comprises a first electronic assembly 122 and a second electronic assembly 124. The first electronic assembly 122 and the second electronic assembly 124 are exemplary of distinctive electronic sub-systems that are routinely separated due to design constraints. The perspective view of FIG. 1 depicts by example an irregular surface 126 on a first surface of the second electronic assembly 124. The irregular surface 126 lies in close proximity to a second surface of the energy storage apparatus 110. The reader can appreciate that the second side of the first electronic assembly 122 that is not directly visible in the perspective view of FIG. 1 also has an irregular surface similar to the irregular surface 126. The irregular surface on the first electronic assembly 122 is mirrored by recesses 136 formed in the surface 132 of a spacing apparatus 130 depicted by example in FIG. 1.

The spacing apparatus 130 comprises a resilient material with insulating properties. The spacing apparatus 130 preferably encloses multiple sides of the energy storage apparatus 110. This collocation or mechanical coupling between the energy storage apparatus 110 and the spacing apparatus 130 provides a best mode for the instant invention in terms of shielding, grounding, and sourcing energy for the apparatus for packaging electronics. Since the spacing apparatus 130 has a first surface 132 coincident with the irregular surface of the first electronic assembly 122, the spacing apparatus 130 advantageously provides mechanical shock insulation for the first electronic assembly 122 and the energy storage apparatus 110. This mechanical shock insulation is also anticipated due to the effect of the spacing apparatus 130 coincident with the explicitly depicted irregular surface 126 of the second electronic assembly 124. The first and second conductive surfaces of the energy storage apparatus 110 advantageously provide shielding between the first and second the electronic assemblies 122, 124. More efficient containment of the energy within the distinct portions of the electronic assembly 120 provides an enhancement in electronic efficiency. With improved shielding, the apparatus 100 may be reduced in size, resulting in an improvement in mechanical integrity. A practical implementation spacing apparatus 130 in light of the instant invention is preferably based on a D-1110 shock absorbent rubber designed and distributed primarily by E.A.R Specialty Composites, of Indianapolis, Ind.

The preferred combination of the spacing apparatus 130 and the energy storage apparatus 110 also advantageously increases the surface area of available grounding paths between the first and second electronic assemblies 122, 124. One skilled in the art of electronic packaging utilizing the first conductive surface and the second conductive surface of the energy storage apparatus 110 coupled with the electronic assembly 120 will appreciate the more efficient grounding provided by the apparatus 100.

It is to be understood that the FIG. 1 electronic device is exemplary only and that much other equipment not here shown nor here relevant may be required in a practical electronic device.

The FIG. 2 diagram depicts the energy storage apparatus 110 when it is not sandwiched in or surrounded by the spacing apparatus 130 on multiple sides. This view depicts the second conductive surface 114 which, in light of previously outlined example of the instant invention, lies in close proximity to the second electronic assembly 124 of the electronic assembly 120 utilizing the mechanical coupling provided by the spacing apparatus 130. In the preferred embodiment, the second conductive surface 114 is overlaid by the spacing apparatus 130. External leads 202 of the energy storage apparatus 110 are shown as an illustration but not a limitation on how the energy storage apparatus 110 connects electrically to another coupled element.

The FIG. 3 diagram depicts the energy storage apparatus 110, displaying an oblique view of the first conductive surface 112, the location of the dielectric material 116, and the exemplary location of the external leads 202. The first conductive surface 112 of the energy storage apparatus 110 lies in close proximity to the first electronic assembly 122 by way of the coupling provided by the spacing apparatus 130.

The energy storage apparatus 110 is in one form of the instant invention, preferably a capacitor. In another form the energy storage apparatus 110 is implemented as a battery. One of the major design constraints that exists in wireless electronics technologies is the trade-off between a form factor strongly influenced by the size of the energy storage apparatuses and the market demand for smaller, lighter apparatuses for packaging electronics. The present invention provides an additional option in the design of an energy source with a reduced form factor. The present invention advantageously results in a potential for more efficient use of electronic resources that can lead to a reduced form factor yielding improved mechanical integrity. In light of the instant invention, the energy storage apparatus implemented as a capacitor and as a battery are both preferably based on a XTWP11997M Slim Pack designed and distributed primarily by Motorola Energy Systems, of Atlanta, Ga.

The reader is referred to the FIG. 4 prior art representation of an exemplary subscriber unit 400 depicting a smaller-than-scale view of various electronic and mechanical subsystems in the absence of the external housing. The location 402 formed to create a recess in the mechanical assembly preferably represents the location of a primary cell energy storage apparatus or a rechargeable energy storage apparatus. The prior art energy storage apparatus 404 is representative of generally available Nickel-Cadmium batteries based on a 6086552G01 custom-designed three-cell energy storage apparatus designed and distributed primarily by National Power Corporation, of Chicago, Ill. The primary cell energy storage apparatus or rechargeable energy storage apparatus located at 402 works in conjunction with the Nickel-Cadmium battery 404 to provide power to the subscriber unit 400. The reader can appreciate the effect the Nickel-Cadmium battery has in determining the total volume of the subscriber unit 400.

Figure 5:
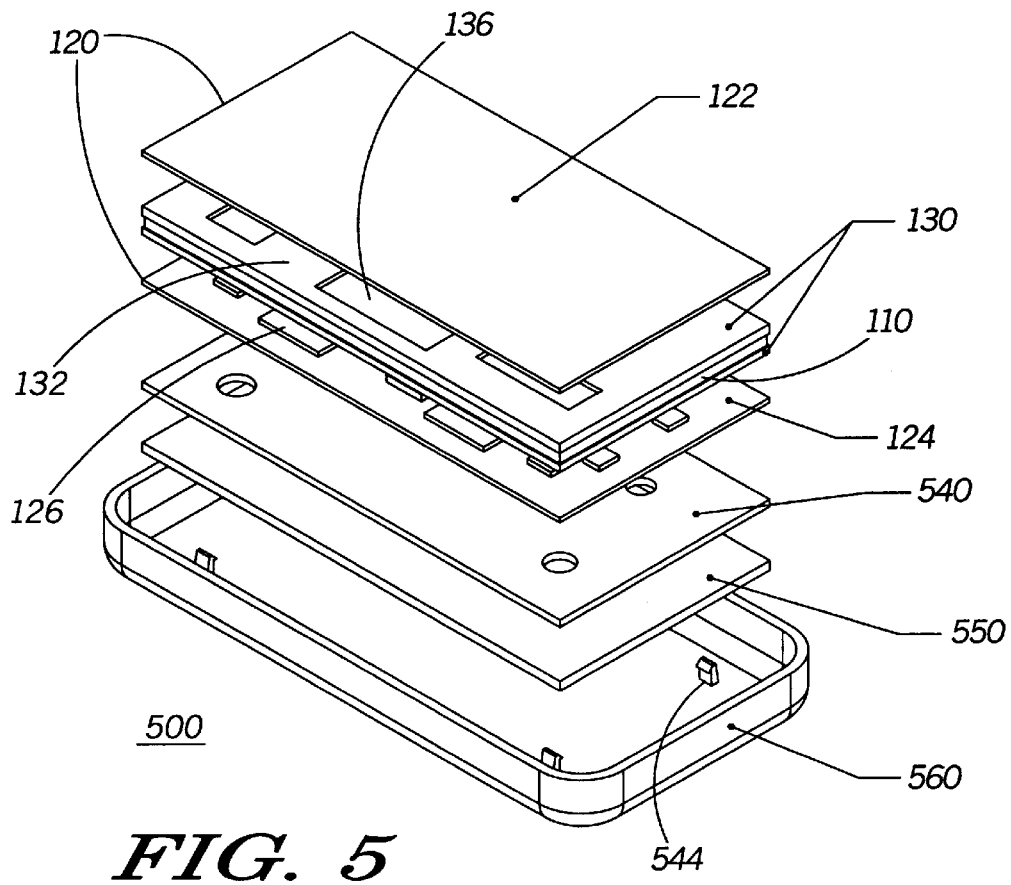
FIG. 5 is a diagram of an exemplary subscriber unit SU in accordance with the instant invention.

For a clearer understanding of the inventive principles disclosed herein, the reader is referred to the FIG. 5 diagram of an exemplary subscriber unit (SU) 500 in accordance with the instant invention. Such SUs are commonly called pagers or messaging units and are available from Motorola Incorporated, of Schaumburg, Ill. It is understood that ordinarily available SUs will be modified in accordance with the principles discussed here in accordance with the present invention. The SU 500 having improved mechanical integrity depicted, by way of example, can be used in a conventional communications system. The SU 500 comprises two energy storage elements 110, 550 for providing power to the electronics device in conjunction with a primary cell energy source or a rechargeable energy source not explicitly depicted in the FIG. 5 example. The presence of a second energy storage element 550 utilizing the inventive techniques in conjunction with the first energy storage element 110 adds value to the subscriber unit 500 by providing multi-purpose use for shielding, and the second energy storage element 550 provides an additional energy source. The energy storage elements 110, 550 operating in conjunction with spacing elements 130, 540 enhance the operating environment of the SU 500, whereby an improvement in mechanical integrity of the subscriber unit is achieved.

In the SU 500 in accordance with the instant invention, the first electronic assembly 122 is preferably a processing system. Likewise, the second electronic assembly 124 preferably is a radio frequency system comprising modules and subsystems implementing radio frequency or shorter wavelength signaling. As one skilled in the art of electrical design can appreciate, the existence of electromagnetic coupling between the two electronic assemblies 122, 124 is usually not a desired result. One knows the need to isolate the lower power subsystems primarily utilizing digital signaling of the processing system of the first electronic assembly 122 from the higher power and higher frequency radio frequency system of the second electronic assembly 124. The multi-purpose use of the energy storage elements 110, 550 combined with the spacing elements 130, 540 advantageously enhances the shielding between the various elements of the electronic assemblies 122, 124.

The second energy storage element 550 preferably utilizes a second spacing element 540 with exemplary holes drilled through to provide for grounding contacts. One skilled in the art will make use of known techniques to properly utilize the additional conductive paths for grounding provided by the energy storage elements 110, 550. The SU 500 in accordance with the instant invention also preferably utilizes known paints with conductive attributes on the surface of the portion of the housing 560 in closest proximity to the second energy source element 550 illustrated by example. The remainder of the housing for the subscriber unit is not depicted for clarity in the drawing, yet it is understood other portions of the housing are necessary to complete the subscriber unit 500. In one form, the second energy storage element 550 can be attached to the housing 560 by some attachment means 544 depicted by example. In another form, the second energy storage element 550 coupled to another spacing element not explicitly depicted can be attached to the housing 560 by some form of generally known adhesive. The practical implementation of the second spacing element 540 in light of the instant invention is preferably based on a D-1110 shock absorbent rubber designed and distributed primarily by E.A.R Specialty Composites, of Indianapolis, Ind. It is to be understood that the subscriber unit 500 is exemplary only and that much other equipment not here shown nor here relevant may be required in a practical subscriber unit.

The capabilities of the energy storage element 110, 550 in the preferred form of a capacitor and in the alternative form of a battery are known. The energy storage element better suited for surface mount electronic assemblies preferably can replace the voluminous Nickel-Cadmium source depicted in the prior art example of FIG. 4. The combination of the energy storage element 110, 550 in conjunction with the spacing apparatus advantageously allows the SU to source more energy to the electronic assembly 120 while decreasing the size of the SU 500. In addition, the instant invention allows for multi-purpose use of elements while at the same time improving mechanical integrity of the subscriber unit 500.

Figure 6:
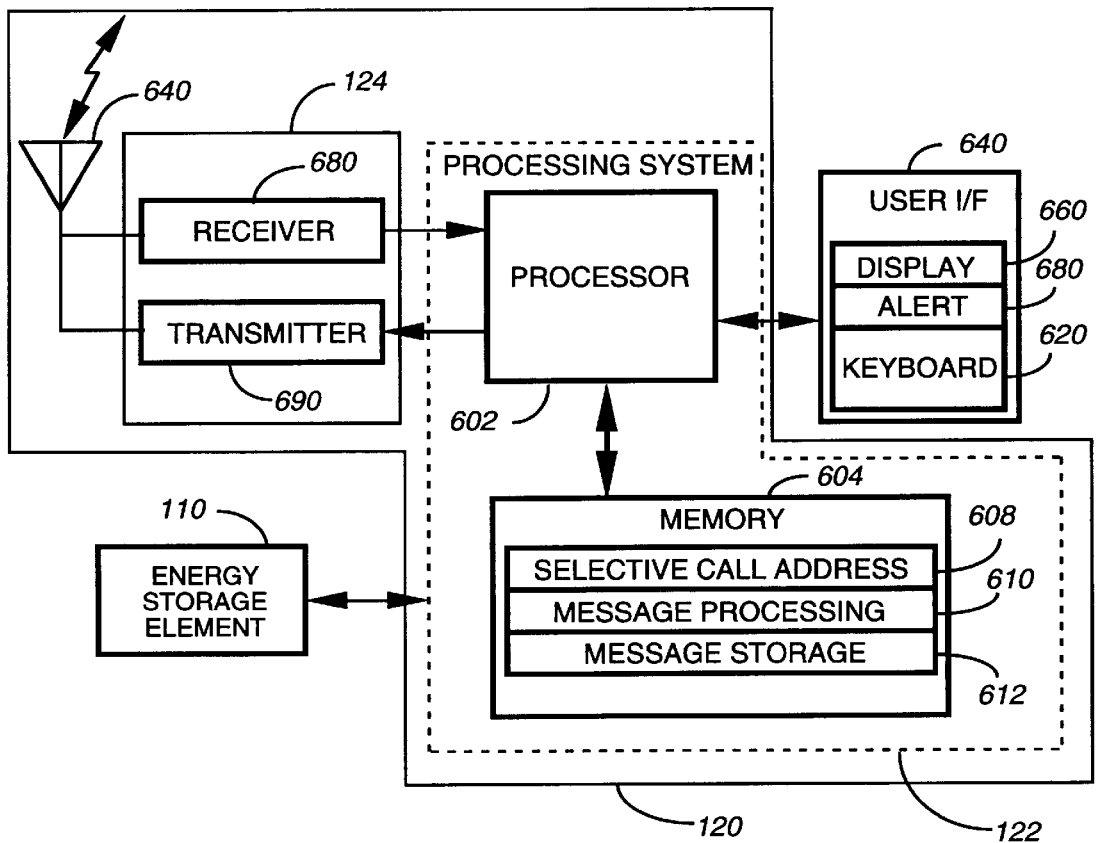
FIG. 6 is an electrical block diagram of the subscriber unit in accordance with the instant invention.

As we continue in the discussion of the instant invention, the reader is referred to the FIG. 6 electrical block diagram of the subscriber unit 500 in accordance with the instant invention such as can be used preferably with a conventional one-way or, alternatively, with a two-way communications system infrastructure. The subscriber unit 500 comprises an antenna 640 for intercepting an outbound message and for transmitting an inbound message. The antenna 640 is coupled to a conventional receiver 680 for receiving the outbound message and is also coupled to a conventional transmitter 690 for transmitting the inbound message. The conventional receiver 680 and the conventional transmitter 690 comprise a radio frequency system 124 within the SU 500. The receiver 680 and the transmitter 690 comprising the radio frequency system 124 are coupled to the first electronic assembly 122, which is a processing system for controlling the energy storage element 110, processing the outbound and inbound messages, and for controlling the second electronic assembly 124 in accordance with the instant invention. A user interface 640 is also coupled to the processing system for interfacing with a user. The user interface comprises a conventional display 660 for displaying the inbound and outbound messages, a conventional alert element 680 for alerting the user when the outbound message arrives, and a conventional keyboard 620 for user input and for controlling the subscriber unit 500. The processing system comprises a conventional processor 602 and a conventional memory 604. The memory 604 comprises software elements and other variables for programming the processing system in accordance with the instant invention. The memory 604 includes a selective call address 608 to which the subscriber unit 500 is responsive, and a message processing element 610 for processing inbound and outbound messages through well-known radio messaging techniques. The memory 604 further comprises a message storage area 612 for storing the inbound and outbound messages. In the preferred form of the instant invention, the second electronic assembly 124 is a radio frequency system comprising the receiver 680. In an alternative form of the SU 500, the radio frequency system comprises the receiver 680 as well as a transmitter 690. The SU 500 also includes the energy storage element 110 coupled to the processing system for providing power. Though not explicitly depicted in the FIG. 6 electrical block diagram rendering of the subscriber unit 500, the previously described second energy storage element 550 along with the coupled second spacing element 540 are understood to further enhance the effects of sourcing energy, shielding, and grounding in light of the instant invention. It to be understood that the FIG. 6 subscriber unit 500 is exemplary only and that much other equipment not here shown nor here relevant may be required in a practical subscriber unit.

The reader can appreciate the implementation of the instant invention utilizing the combinations of enhanced shielding, grounding, and sourcing energy. A logical result will be an increase in electronic/electrical efficiency in a more compact form factor whereby the resultant products will have improved mechanical integrity. It will be apparent to one of ordinary skill in the art that the disclosed invention may be modified in numerous ways and may assume many embodiments other than the preferred forms specifically set out and described above. Accordingly, it is intended by the appended claims to cover all modifications of the invention which fall within the true scope of the invention.

What is claimed is:

1. An apparatus for packaging electronics, the apparatus having improved mechanical integrity, the apparatus comprising:

a first energy storage apparatus for providing power, the first energy storage apparatus comprising a first conductive surface and a second conductive surface separated by a first dielectric material;

a first electronic assembly, having a first irregular surface lying in close proximity to said first conductive surface of said first energy storage apparatus;

a first spacing apparatus comprising a resilient insulating material, mechanically coupled between said first electronic assembly and said first conductive surface of said first energy storage apparatus, and shaped to conform to said first irregular surface;

a second electronic assembly, having a second irregular surface lying in close proximity to said second conductive surface of said energy storage apparatus; and a second spacing apparatus comprising the resilient insulating material, mechanically coupled between said second electronic assembly and said second conductive surface of said first energy storage apparatus, and shaped to conform to said second irregular surface, wherein said first energy storage apparatus is arranged such that it provides electrostatic shielding between said first and second electronic assemblies, as well as an electrical ground path for said first and second electronic assemblies.

2. The apparatus of claim 1, further comprising:

a second energy storage apparatus comprising a third conductive surface and a fourth conductive surface separated by a second dielectric material; and a third spacing apparatus comprising the resilient insulating material, mechanically coupled between said second electronic assembly and said second energy storage apparatus, said third spacing apparatus having holes drilled through for grounding contacts.

3. The apparatus of claim 1, wherein said first energy storage apparatus is a capacitor.

4. The apparatus of claim 1, wherein said first energy storage apparatus is a battery.

5. A subscriber unit having improved mechanical integrity, the subscriber unit comprising:
- a first energy storage element for providing power, the first energy storage element comprising a first conductive surface and a second conductive surface separated by a first dielectric material;
- a first electronic assembly, having a first irregular surface lying in close proximity to said first conductive surface of said first energy storage element, the first electronic assembly comprising a radio frequency system;
- a first spacing element comprising a resilient insulating material, mechanically coupled between said first electronic assembly and said first conductive surface of said first energy storage element, and shaped to conform to said first irregular surface;
- a second electronic assembly, having a second irregular surface lying in close proximity to said second conductive surface of said first energy storage element, the second electronic assembly comprising a processing system coupled to the first electronic assembly and programmed to control the first energy storage element and the first electronic assembly; and
- a second spacing element comprising the resilient insulating material, mechanically coupled between said second electronic assembly and said second conductive surface of said first energy storage element, and shaped to conform to said second irregular surface,
- wherein said first energy storage element is arranged such that it provides electrostatic shielding between said first and second electronic assemblies, as well as an electrical ground path for said first and second electronic assemblies.

6. The subscriber unit of claim 5, further comprising:
- a second energy storage element comprising a third conductive surface and a fourth conductive surface separated by a second dielectric material; and
- a third spacing element comprising the resilient insulating material, mechanically coupled between said second electronic assembly and said second energy storage element, said third spacing element having holes drilled through for grounding contacts.

7. The subscriber unit of claim 5, wherein said first energy storage element is a capacitor.

8. The subscriber unit of claim 5, wherein said first energy storage element is a battery.

\* \* \* \* \*